US008855553B2

(12) United States Patent
Duerksen

(10) Patent No.: US 8,855,553 B2
(45) Date of Patent: Oct. 7, 2014

(54) SCALABLE MILLIMETER-WAVE WIRELESS NETWORK ARCHITECTURE FOR HIGH USER CONCENTRATIONS

(75) Inventor: Gary Lynn Duerksen, Ward, CO (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/574,246

(22) PCT Filed: Mar. 2, 2012

(86) PCT No.: PCT/US2012/027357
§ 371 (c)(1),
(2), (4) Date: Jul. 19, 2012

(87) PCT Pub. No.: WO2013/130089
PCT Pub. Date: Sep. 6, 2013

(65) Prior Publication Data
US 2013/0231045 A1    Sep. 5, 2013

(51) Int. Cl.
*H04B 7/185* (2006.01)
*H04W 84/18* (2009.01)
(52) U.S. Cl.
CPC ................................. *H04W 84/18* (2013.01)
USPC ........................................ 455/13.1; 455/41.2
(58) Field of Classification Search
USPC ............................ 455/11.1, 13.1, 15, 16, 449
See application file for complete search history.

(56) References Cited

U.S. PATENT DOCUMENTS

| 6,714,800 | B2 | 3/2004 | Johnson et al. | |
|---|---|---|---|---|
| 7,664,534 | B1 | 2/2010 | Johnson | |
| 2002/0077151 | A1* | 6/2002 | Matthews et al. | 455/561 |
| 2002/0181444 | A1 | 12/2002 | Acampora | |
| 2006/0183421 | A1* | 8/2006 | Proctor et al. | 455/11.1 |
| 2011/0044169 | A1 | 2/2011 | Liu | |
| 2011/0304504 | A1* | 12/2011 | Prasad et al. | 342/368 |
| 2012/0135677 | A1* | 5/2012 | Hsu et al. | 455/11.1 |

OTHER PUBLICATIONS

IEEE 802.11n "Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications Amendment 5: Enhancements for Higher Throughput," Oct. 29, 2009.

Cordeiro et al., IEEE 802.11ad: Introduction and Performance Evaluation of the First Multi-Gbps WiFi Technology, Proceedings of the 2010 ACM International workshop on mmWave communications: from circuits to networks.

(Continued)

*Primary Examiner* — Tu X Nguyen
(74) *Attorney, Agent, or Firm* — Turk IP Law, LLC

(57) ABSTRACT

Technologies are presented for an architecture and infrastructure for a scalable, very high bandwidth, wireless network that can accommodate arbitrarily high geographic concentrations of high-bandwidth users. The architecture may include a network of highly localized service areas that communicate with a central access point through a hierarchy of aggregate-and-relay stages. Communications may be mediated by a hybrid combination of ad-hoc and infrastructure-network features that are supported separately within the framework of a standardized system, for example in the 60 GHz (millimeter-wave) band. The infrastructure may include a dense mesh of fixed control points that communicate over lossy, high-bandwidth, directional channels permitting dense spatial frequency sharing and providing for highly localized coverage, thereby enabling high user densities.

36 Claims, 8 Drawing Sheets

(56) References Cited

OTHER PUBLICATIONS

Xu et al., "Spatial and Temporal Characteristics of 60-GHz Indoor Channels," IEEE Journal on Selected Areas in Communications, vol. 30, No. 3, Apr. 2002.

International Search Report PCT/US12/ 027357 filed Mar. 2, 2012, mailed May 30, 2012.

"Draft Standard for Information Technology-Telecommunications and Information Exchange Between Systems-Local and Metropolitan Area Networks-Specific Requirements-Part 11: Wireless LAN Medium Access Control (MAC) and Physical Layer (PHY) Specifications-Amendment 6: Enhancements for Very High Throughput in the 60GHz Band," IEEE Std P802.11u/D9.0, pp. 1-186, Jun. 2010.

* cited by examiner

SCALABLE MILLIMETER-WAVE WIRELESS NETWORK ARCHITECTURE FOR HIGH USER CONCENTRATIONS

BACKGROUND

Unless otherwise indicated herein, the materials described in this section are not prior art to the claims in this application and are not admitted to be prior art by inclusion in this section.

The widespread adoption of wireless mobile smart devices such as smartphones, tablet computers, Personal Digital Assistants (PDAs), etc. has led to explosive growth in demand for wireless services. The resulting infrastructure burden is particularly acute in areas with high user concentrations, where existing infrastructure cannot accommodate the load imposed by the large number of users simultaneous competing for limited resources.

Usage scenarios in which the conventional paradigms fail may include, for example, sporting events where spectators access online video content, conferences at which participants engage in interactive multimedia presentations, pervasive augmented reality, universal wireless video calling, mobile interactive online gaming, etc. Future network infrastructure may necessitate advanced wireless technology to meet the resulting bandwidth demands of large numbers of users in confined areas, which is not met by currently available technologies or standards.

SUMMARY

The present disclosure generally describes technologies for providing scalable millimeter-wave wireless network architecture for high user-concentrations.

According to some examples, a method for providing a scalable wireless network architecture for high-user concentrations may include forming a network structure based on a plurality of wireless central points (PCPs) each PCP serving an ad-hoc basic service area (BSA) and aggregating communication traffic within their respective BSA for forwarding to a cluster PCP within a clustered hierarchical network, and enabling wireless communication between user devices and respective PCPs over one or more lossy, high-bandwidth, directional channels.

According to other examples, a scalable wireless network for high-user concentrations may include a plurality of wireless central points (PCPs) each PCP serving an ad-hoc basic service area (BSA) and aggregating communication traffic within their respective BSA for forwarding to a cluster PCP within a clustered hierarchical network; and a plurality of user devices in each BSA enabled to wirelessly communicate with respective PCPs over one or more lossy, high-bandwidth, directional channels.

According to further examples, a computer-readable storage medium may have instructions stored thereon for providing a scalable wireless network architecture for high-user concentrations. The instructions may include forming a network structure based on a plurality of wireless central points (PCPs) each PCP serving an ad-hoc basic service area (BSA) and aggregating communication traffic within their respective BSA for forwarding to a cluster PCP within a clustered hierarchical network; and enabling wireless communication between user devices and respective PCPs over one or more lossy, high-bandwidth, directional channels.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
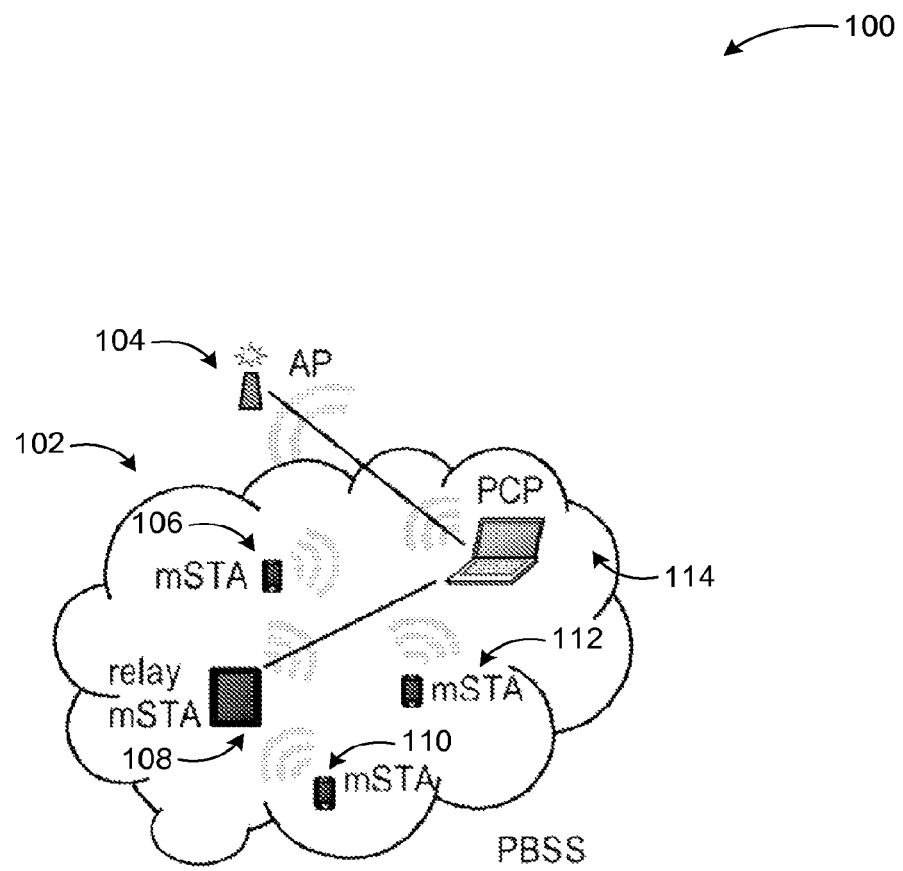
FIG. 1 illustrates an example architecture for a wireless system according to Personal Basic Service Set ad-hoc specification.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to providing scalable millimeter-wave wireless network architecture for high user-concentrations.

Briefly stated, technologies are presented for an architecture and infrastructure for a scalable, very high bandwidth, wireless network that can accommodate arbitrarily high geographic concentrations of high-bandwidth users. The architecture may include a network of highly localized service areas that communicate with a central access point through a hierarchy of aggregate-and-relay stages. Communications may be mediated by a hybrid combination of ad-hoc and infrastructure-network features that are supported separately within the framework of a standardized system, for example in the 60 GHz (millimeter-wave) band. The infrastructure may include a dense mesh of fixed control points that communicate over lossy, high-bandwidth, directional channels permitting dense spatial frequency sharing and providing for highly localized coverage, thereby enabling high user densities.

As used herein, the term "lossy" refers to a communication mode, where free space path losses may exceed multipath losses by multiple factors attenuating the signal substantially (for example, >85 dB) such that the associated loss characteristics may be described by an exponential absorption mode. The term "high-bandwidth" refers to communication bandwidths exceeding conventional wireless communication bandwidths such as one or more GHz for each communication channel. The term "directional" refers to communication channels where the wireless communication between two nodes is focused between the nodes such that interference with other nodes is avoided or substantially reduced. One approach for directional communication is use of highly directional antennas with relatively narrow beams. This approach may not be practical for consumer devices such as handheld computers, laptops, etc. In a system according to embodiments, a very high frequency (millimeter-wave) band may be used providing the directionality in conjunction with the high loss characteristic. The term "highly localized service area" refers to basic service areas of approximately 10 meters or less.

For millimeter-wave communications in the 60-GHz band, free space path losses may exceed multipath losses by a factor of 10—attenuating the signal by about 85 dB over 10 meters—and the associated loss characteristics may be described by an exponential absorption model rather than the multipath Rayleigh model used for conventional wireless frequencies. These properties result in highly localized service areas (about 10 m) and favor highly directional transmissions for high user concentrations FIG. 1 illustrates an example architecture for a wireless system according to Personal Basic Service Set ad-hoc specification.

In a wireless network, the components that can connect into a wireless medium in the network may be referred to as stations (mSTAs). The stations are equipped with wireless network interface controllers (WNICs) to facilitate communication over the wireless medium. The mSTAs in a Personal Basic Service Set (PBSS), as shown in diagram 100, may be categorized as user devices (mSTA 106, 110, and 112) and as a relay mSTA 108, which may also be a user device configured to relay communication from nearby mSTAs to a control point (PCP 114). The PCP 114 may forward traffic from mSTAs within its cluster 102 to an access point (AP 104). mSTAs may be mobile devices such as laptops, personal digital assistants, IP phones and other smartphones, or fixed devices such as desktops and workstations that are equipped with a wireless network interface.

Capacity in many existing wireless network technologies is inadequate to provide for evolving usage scenarios. A system according to embodiments provides a hybrid Personal Basic Service Set ad-hoc network infrastructure in order to support high-bandwidth wireless communications in areas with high user concentrations. Thus, both a new network infrastructure and architecture are provided. Example embodiments exploit millimeter-wave communication technology in combination with an architecture designed to accommodate high user densities such as conference centers, sports arenas, and large performance or lecture halls.

The network architecture described herein leverages the high free-space path-loss and associated directional characteristics of millimeter-wave transmissions to permit large numbers of users in close proximity to access a small number of high-bandwidth communication channels without or with minimal interference. Further, the aggregate bandwidth of the 60 GHz communication band, nominally 7 GHz, may ensure ample bandwidth for a large number of users.

Some standards such as the IEEE 802.11ad draft proposal for millimeter-wave network standards provide for several network architectures. However, these architectures target localized networks of a small number of extremely high-bandwidth devices (such as uncompressed HD video), and do not satisfy the requirements of a geographically distributed network serving a large numbers of users.

Figure 2:
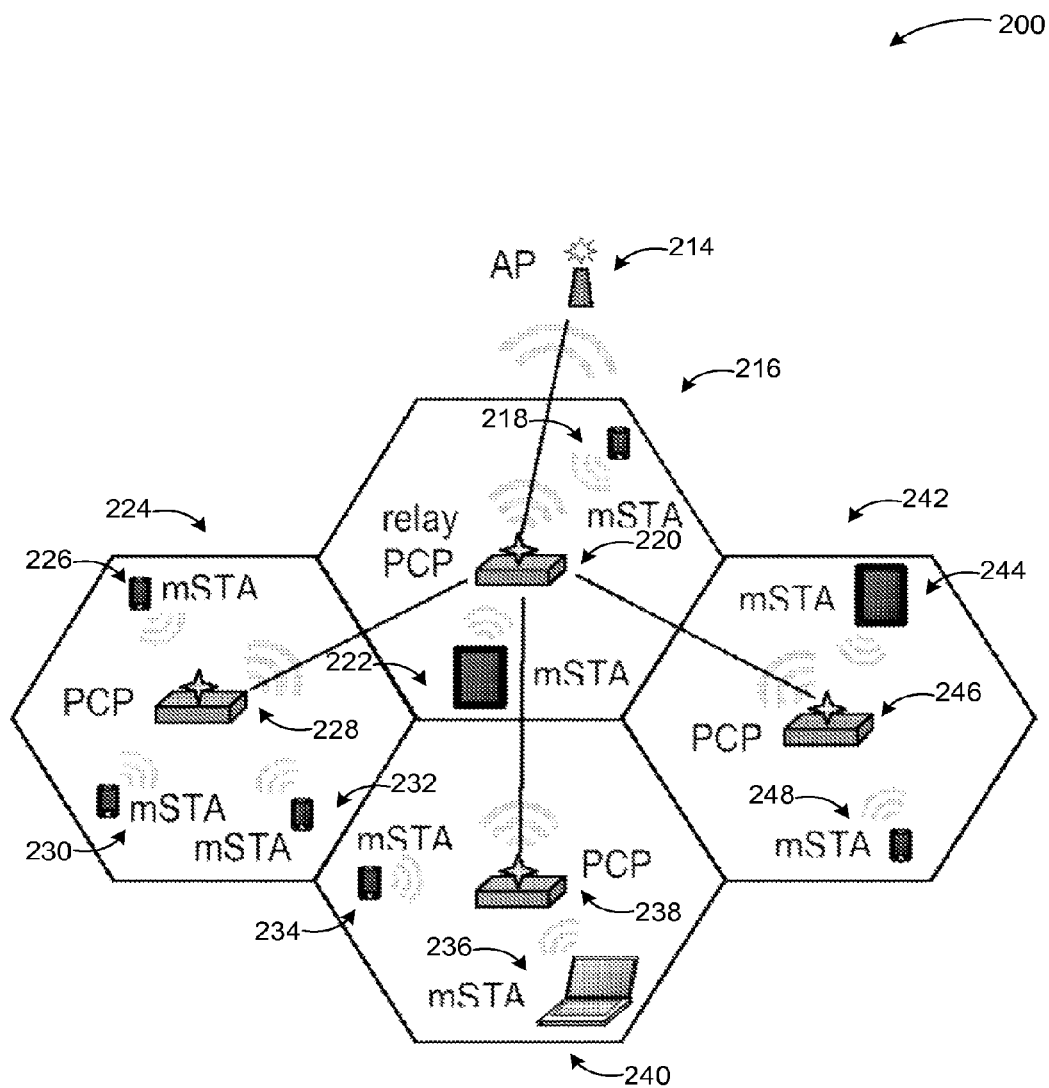
FIG. 2 illustrates an example architecture for a wireless system according to a hybrid Personal Basic Service Set ad-hoc network infrastructure.

FIG. 2 illustrates an example architecture for a wireless system according to a hybrid Personal Basic Service Set ad-hoc network infrastructure, arranged in accordance with at least some embodiments described herein. Some example embodiments incorporate features of infrastructure and ad-hoc networks, generating a hybrid network architecture that enables a scalable, high-capacity, millimeter-wave network that can be implemented in conformance with standards or in proprietary environments.

At the physical layer, the communication band of a system according to embodiments encompasses a very high bandwidth in order to support a large number of users simultaneously. The basic service area (BSA) for wireless access is very localized (e.g. approximately 10 meters) to prevent congestion at the wireless control point (PCP). The wireless signals in millimeter-wave range are highly directional to minimize interference between terminals (mSTA's) in a BSA and between PCP's serving neighboring BSA's. The physical-layer requirements may be satisfied by the introduction of a stationary BSA control-point device that aggregates and relays the communications originating in the BSA as well as communications that are relayed to the control point from other BSA's.

At the control layer, a system according to embodiments may support multi-link relaying to enable a scalable architecture and station clustering to optimize spatial frequency sharing among the limited number of channels. Such a system may permit the aggregation of data frames in order to multiplex the signals from different sources onto the available channel bandwidth efficiently. Furthermore, multi-source and multi-destination subframe addressing may be supported to enable communications from a large number of users to efficiently share the millimeter-wave channels after aggregation.

The control-layer requirements may be satisfied in an architecture according to some embodiments by combining elements of separate specifications for an infrastructure-based network (fixed control points, frame aggregation) with specifications for an ad-hoc network (multi-link relaying, station clustering). For example, Personal Basic Service Set (PBSS) standards for ad-hoc networks and the Basic Service Set (BSS) standards for infrastructure networking may be combined in a hybrid architecture. Table 1 illustrates example network specifications for an example hybridization in some example embodiments.

TABLE 1

BSS and PBSS features for combination hybrid architecture

| BSS | PBSS |
|---|---|
| Fixed control points | Station clustering |
| Frame aggregation | Multi-link relaying |

The PBSS may provide for a loosely structured architecture in which designated wireless stations (mSTA's) assume the role of the PBSS central point (PCP) within an ad-hoc Basic Service Area (PCPs 228, 220, 238, 246 in BSAs 224, 216, 240, and 242, respectively) and relay the traffic via the central Access Point (AP) 214 to the backhaul network. In the example architecture of diagram 200, fixed wireless stations may be installed as dedicated nodes in the manner of an infrastructure network. These infrastructure PCP's (228, 220, 238, 246) may provide network access to mSTA's (226, 230, 232; 218, 222; 234, 236; and 244, 248 respectively) and aggregate the traffic within a BSA (covering a fixed local area), as with a BSS network, while also aggregating and forwarding traffic to other BSA control points, as in a PBSS network.

Figure 3:
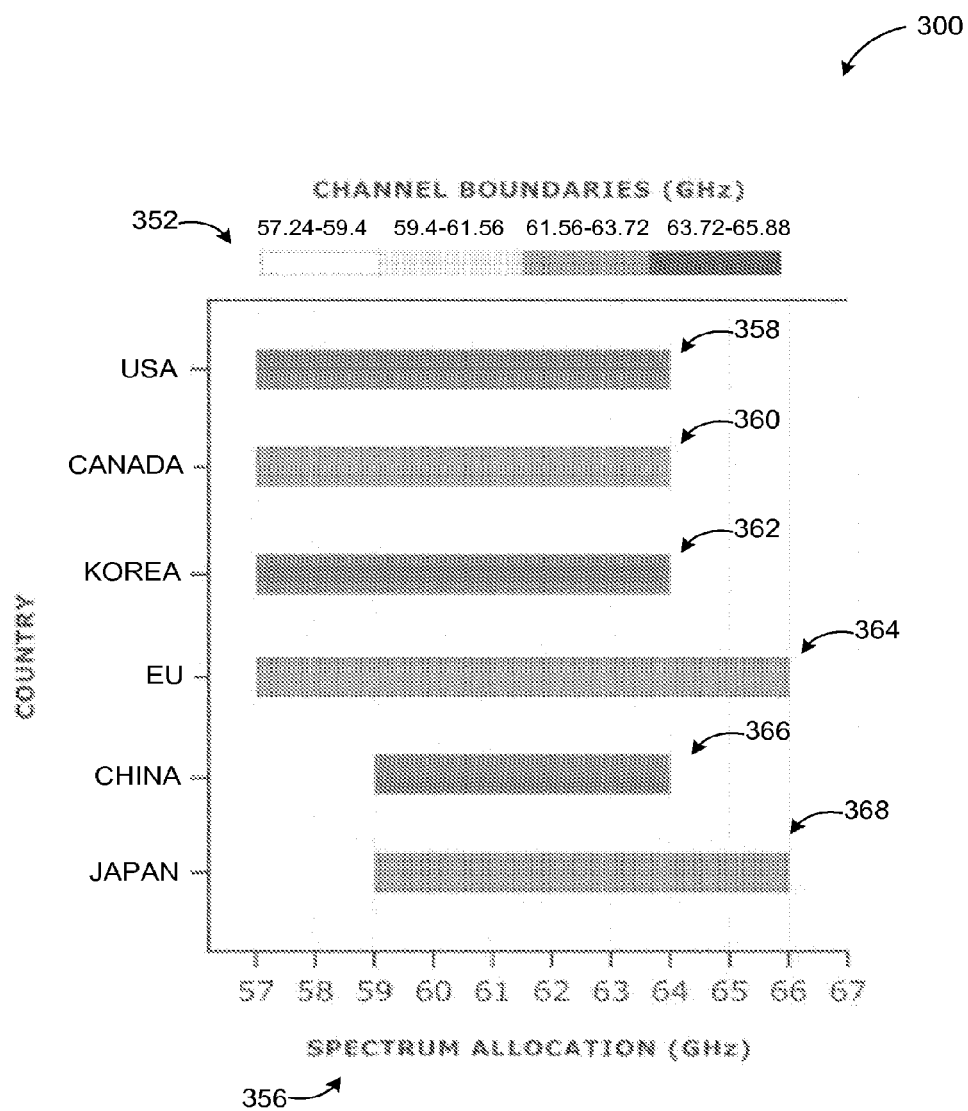
FIG. 3 illustrates spectrum assignments in millimeter-wave band according to an example standard (IEEE 802.11ad)

FIG. 3 illustrates spectrum assignments in millimeter-wave band according to an example standard (IEEE 802.11ad).

As discussed above, the communication band employed in a system according to some embodiments needs to encompass very high bandwidth at the physical layer in order to support a large number of users simultaneously. Furthermore, to prevent congestion at the PCP, the BSA for wireless access needs be very localized and the wireless signals need to be highly directional to minimize interference between user devices in a BSA and between PCP's serving neighboring BSA's.

These conditions are met by millimeter-wave communications. Most wireless communications are regulated through national or regional regulations. In some cases, selected portions of the wireless spectrum may be unregulated or reserved for use by select technologies with minimal regulation (e.g., maximum allowed power). In the latter case, industry developed standards may be employed to ensure widely acceptable usage and prevention of interference between different technologies. For example, the 802.11ad draft standard prescribes the rules for communications in the unregulated 60 GHz band for a number of countries and regions. Diagram 300 shows the allowed bandwidths and channels in the 60 GHz band under the IEEE 802.11 ad standard. Spectrum allocation 356 indicated that in North America (358), Canada (360), and Korea (362) the allowed band is 57 GHz to 64 GHz. In the European Union region (364), the allowed band spans from 57 GHz to 66 GHz, while the allowed bands include 59 GHz to 64 GHz and 59 GHz to 66 GHz in China (366) and Japan (368).

North America (US and Canada), Europe, and Korea specify four channels of 2.16 GHz (352) each span the spectrum from 57 GHz to 64 GHz, providing up to 7 GHz of communication bandwidth. For millimeter-wave communications in the 60-GHz band, free space path losses may exceed multipath losses by a factor of 10—attenuating the signal by about 85 dB over 10 meters—and the associated loss characteristics may be described by an exponential absorption model rather than the multipath Rayleigh model used for conventional wireless frequencies. These properties result in highly localized service areas (about 10 m) and favor highly directional transmissions for high user concentrations.

Figure 4:
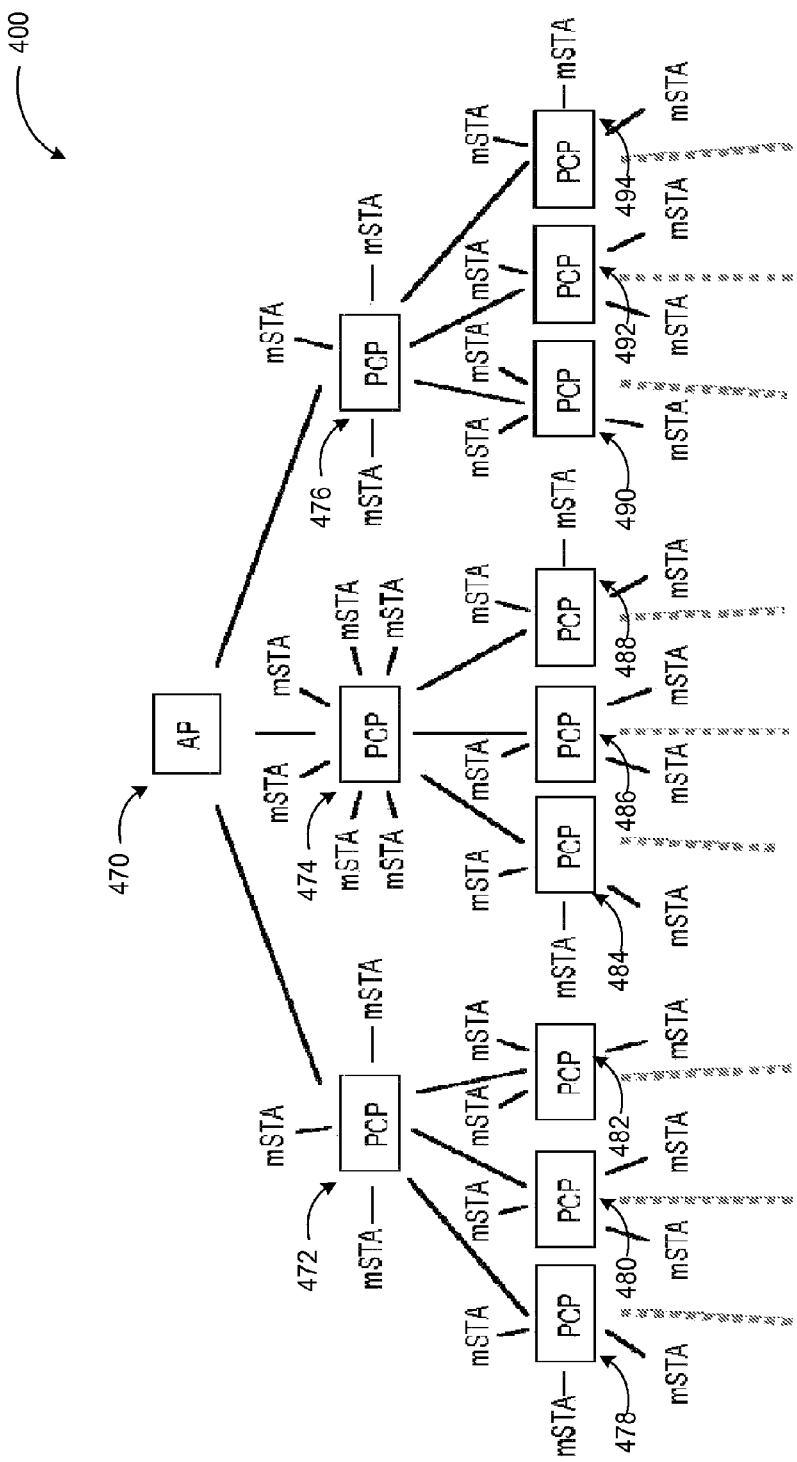
FIG. 4 illustrates a hierarchy of Basic Service Areas (BSAs) according to a hybrid aggregate-and-forward architecture.

FIG. 4 illustrates a hierarchy of Basic Service Areas (BSAs) according to a hybrid aggregate-and-forward architecture, arranged in accordance with at least some embodiments described herein.

Using the capabilities supported by the BSS and PBSS structures, a cluster of infrastructure PCP's may aggregate the traffic within their BSA's and relay the traffic to the PCP with which they are clustered, creating an extended hierarchical network as shown in diagram 400. This process of aggregate-and-relay may be repeated through several tiers, according to the size of the network, until the cluster served by the central AP 470 is reached.

At each tier of the network, a PCP may both service the mSTA's in its BSA and serve as a relay point for the PCP's in its cluster. Access to the PCP may be mediated by scheduled service intervals in accordance with the PCP/AP-clustering (PBSS) specification, so that competing transmissions from different mSTA's and PCP's over the same channel occur during non-overlapping time periods.

The example architecture in diagram 400 includes at the top of the hierarchy central AP 470. At the next level, PCPs 472, 474, and 476 aggregate traffic from the mSTAs (user devices) in their respective BSAs as well as traffic from other PCPs in their respective clusters. For example, PCP 472 may receive traffic from PCPs 478, 480, and 482; PCP 474 may receive traffic from PCPs 484, 486, and 488; and PCP 476 may receive traffic from PCPs 490, 492, and 494. In addition, each PCP at the lower level may also aggregate traffic from their respective mSTAs and other PCPs in their respective clusters.

A number of mSTA's served by one PCP (e.g., within a ~10 meter area) may be limited to a predefined number based on a network format (e.g., 255). In some embodiments, there may be no limit to the total number of mSTA's served in the hierarchy. The aggregate capacity of the extended network served by a single AP of the backhaul network may be 7 Gb/s using available 60 GHz band channels according to current regulations, which may place an upper limit in the thousands on the number of mSTA's in one network based on bandwidth availability, according to one implementation. Of course other (possibly higher) number of nodes may be implemented using other bands, network infrastructures, and communication protocols.

Figure 5:
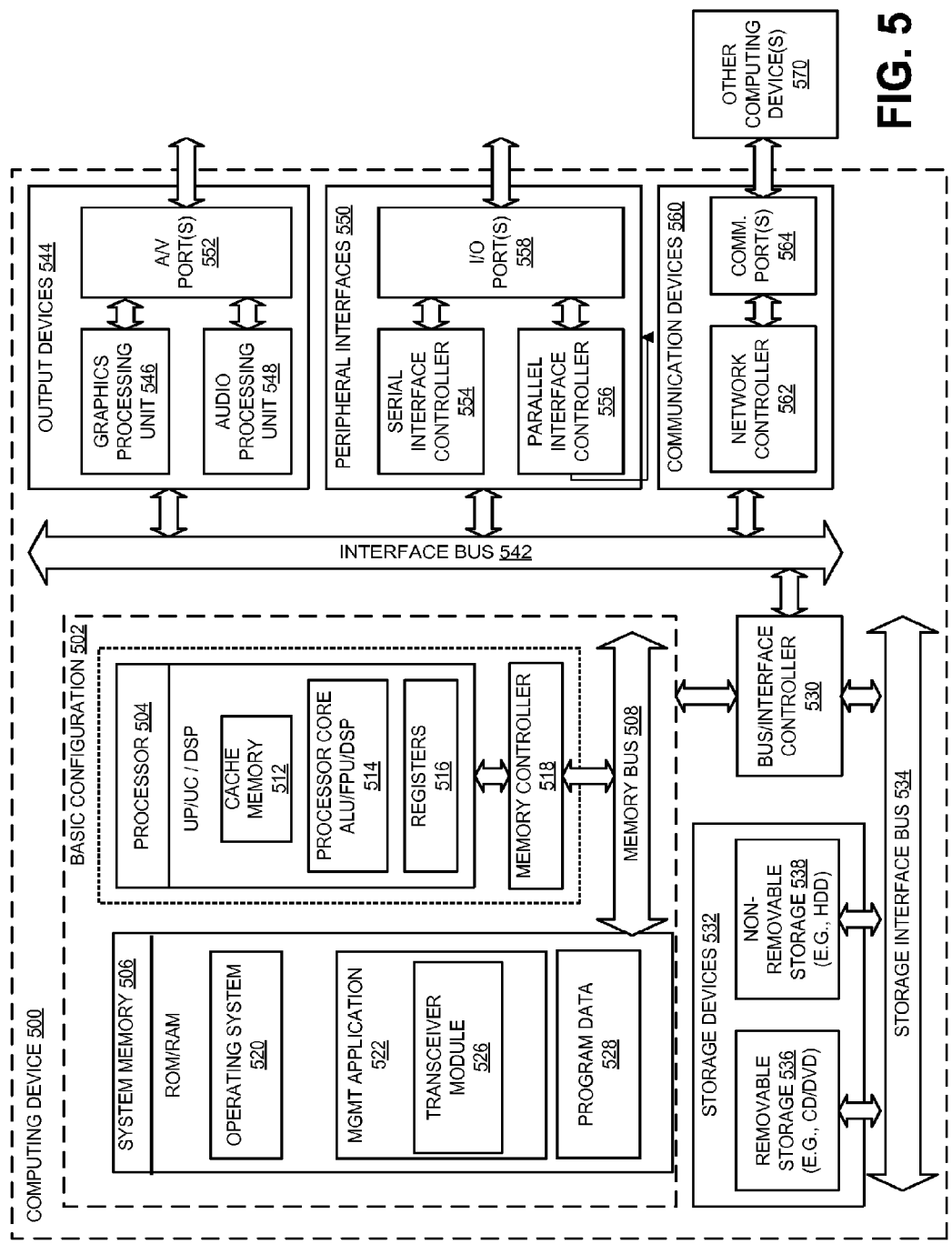
FIG. 5 illustrates a general purpose computing device, which may be used to implement a hybrid aggregate-and-forward architecture.

FIG. 5 illustrates a general purpose computing device, which may be used to implement a hybrid aggregate-and-forward architecture, arranged in accordance with at least some embodiments described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. In some example embodiments, computing device 50 may be (or part of) a wireless central point (PCP) and serve an ad-hoc basic service area (BSA) aggregating communication traffic within its BSA for forwarding to a cluster PCP within a clustered hierarchical network. The system memory 506 may include an operating system 520, a management application 522, and program data 524. The management application 522 may include a transceiver module 526, which may aggregate the communication traffic and forward to the cluster PCP over one or more lossy, high-bandwidth, directional channels as described herein. The program data 524 may include, among other data, channel data, device information, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 542 for facilitating communication from various interface devices (e.g., one or more output devices 544, one or more peripheral interfaces 550, and one or more communication devices 560) to the basic configuration 502 via the bus/interface controller 530. Some of the example output devices 544 include a graphics processing unit 546 and an audio processing unit 548, which may be configured to communicate to various external devices such as a display or speakers via one or more A/V ports 552. One or more example peripheral interfaces 550 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 560 includes a network controller 562, which may be arranged to facilitate communications with one or more other computing devices 570 over a network communication link via one or more communication ports 564. The one or more other computing devices 570 may include other PCPs, end point devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Figure 6:
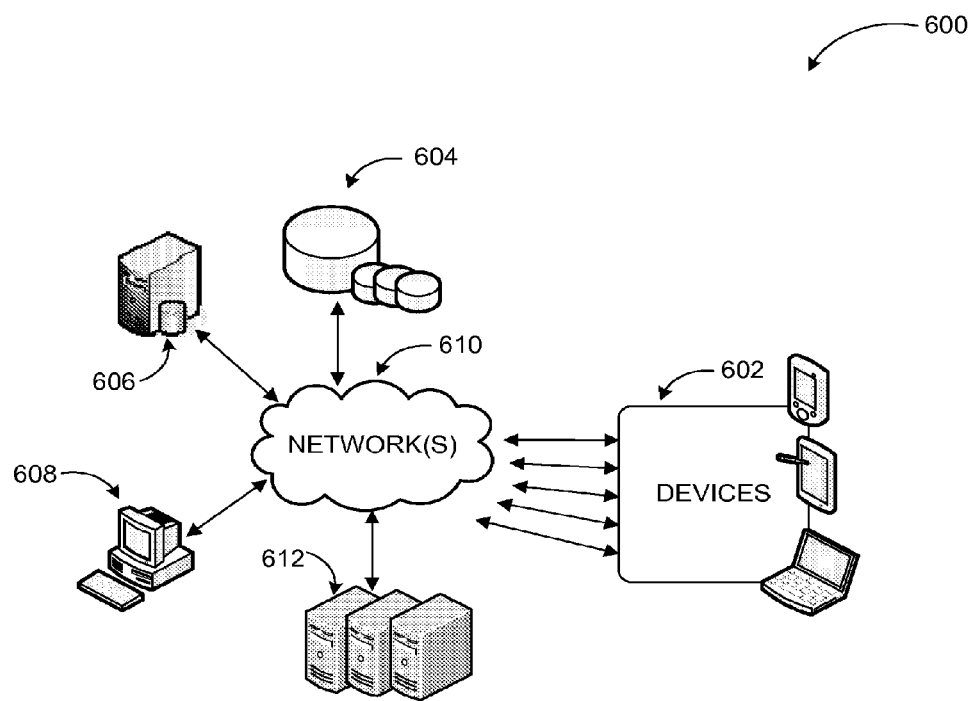
FIG. 6 illustrates a networked environment, where a scalable, millimeter-wave, hybrid aggregate-and-forward architecture may be implemented.

FIG. 6 illustrates a networked environment, where a scalable, millimeter-wave, hybrid aggregate-and-forward architecture may be implemented, arranged in accordance with at least some embodiments described herein.

As shown in diagram 600, an example architecture may enable user devices 602 to participate in high bandwidth communication such as video transmission, data transfers, etc. in high density environments with a number of data sources and other devices. User devices may include smart phones, PDAs, laptops, specialized computing devices such as network enabled cameras, test/measurement devices, and comparable ones.

User devices 602 may communicate wirelessly over lossy, high bandwidth and directional channels with fixed control points (PCPs) serving ad-hoc basic service areas (BSAs). The PCPs may be special purposes devices such as access points or general purpose computing devices (e.g., desktop computer 608) configured to act as a PCP. The PCPs may be structured in layers, where the communication traffic is aggregated by each PCP for the lower level devices reporting to it and forwarded to a higher level cluster PCP until a central access point is reached. Communications may be exchanged over network(s) 610, which may employ a very high frequency range such as millimeter-wave band.

One or more servers 612 may provide network management functionality. Data associated with managing the network and facilitating communications (as well as content to be exchanged over the network(s)) may be stored in one or more data stores 604, which may be accessible directly or through a database server 606.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication with other networks such as Public Switched Telephone Network (PSTN) or cellular networks. Network(s) 610 provide communication between the nodes described herein through wireless media according to a standardized format such as IEEE 802.11 ad standard.

Many other configurations of computing devices, applications, data sources, and data distribution systems may be employed to implement a scalable, millimeter-wave wireless network for high user concentrations. Furthermore, the networked environments discussed in FIG. 6 are for illustration purposes only. Embodiments are not limited to the example applications, modules, standards, protocols, or processes.

Example embodiments may also include methods for providing a scalable wireless network architecture for high-user concentrations. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 7:
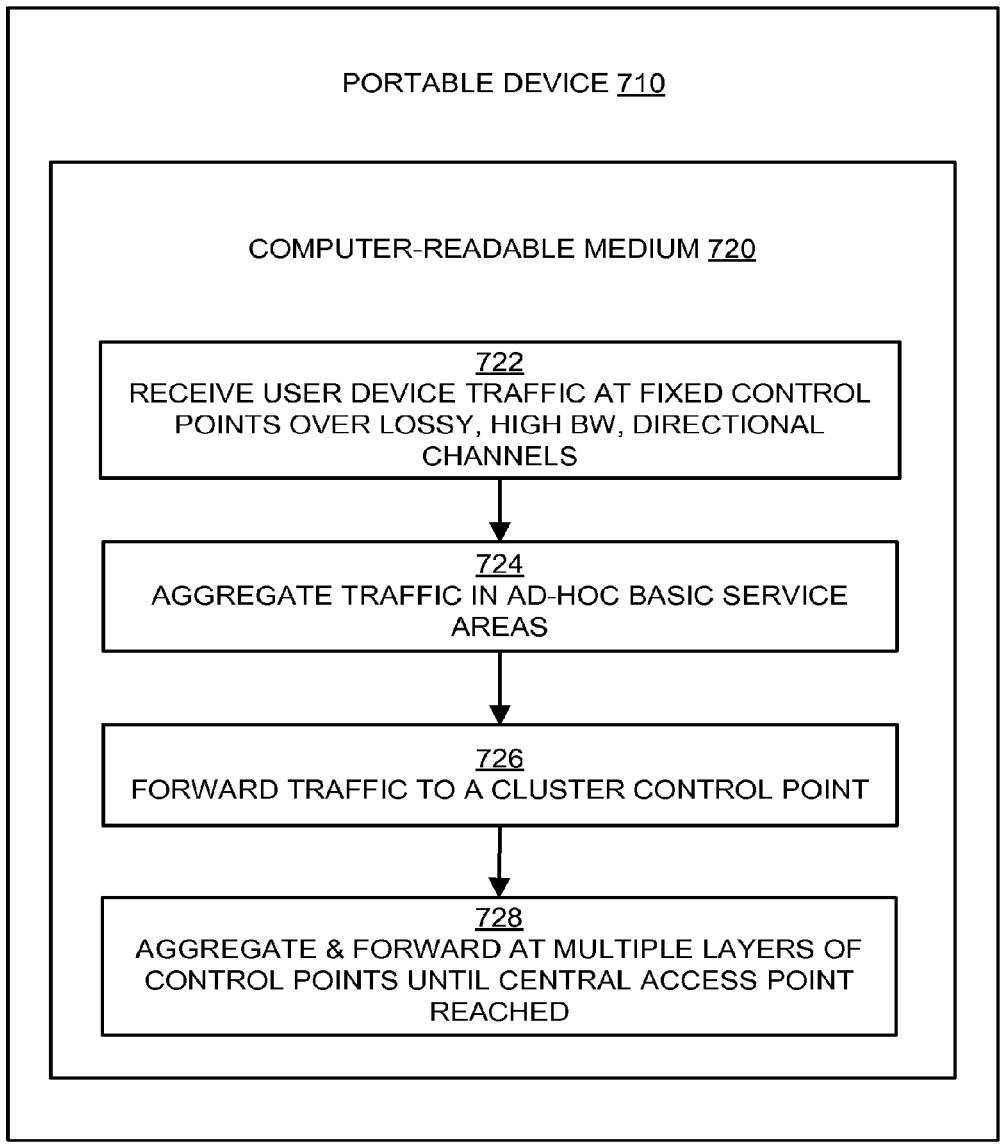
FIG. 7 is a flow diagram illustrating an example method for implementing a scalable, millimeter-wave wireless network for high user concentrations that may be performed by a computing device such as device 500 in FIG. 5.

FIG. 7 is a flow diagram illustrating an example method for implementing a scalable, millimeter-wave wireless network for high user concentrations that may be performed by a computing device such as device 500 in FIG. 5, arranged in accordance with at least some embodiments described herein. Example methods may include one or more operations, functions or actions as illustrated by one or more of blocks 722, 724, 726, and/or 728. The operations described in the blocks 722 through 728 may also be stored as computer-executable instructions in a computer-readable medium such as a computer-readable medium 720 of a computing device 710.

An example process of providing a scalable, millimeter-wave wireless network for high user concentrations may begin with block 722, "RECEIVE USER DEVICE TRAFFIC AT FIXED CONTROL POINTS OVER LOSSY, HIGH BW, DIRECTIONAL CHANNELS", where a PCP such as PCP 478 of FIG. 4 may facilitate wireless communication with a user device over a lossy, high bandwidth, and directional channel. High bandwidth may be accomplished by using higher frequency ranges such as millimeter-wave band, where the channels are lossy and directional. Thus, interference between different user devices may be minimized through the use of the millimeter-wave band.

Block 722 may be followed my block 724, "AGGREGATE TRAFFIC IN AD-HOC BASIC SERVICE AREAS", where the PCP 478 of FIG. 4 may aggregate communication traffic from a plurality of user devices in its assigned basic service area, which may be created in an ad-hoc basis.

Block 724 may be followed my block 726, "FORWARD TRAFFIC TO A CLUSTER CONTROL POINT", where the PCP 478 of FIG. 4 may forward the aggregated communication traffic from a plurality of user devices in its assigned basic service area to a cluster PCP such as PCP 472 of FIG. 4.

Block 726 may be followed my block 728, "AGGREGATE & FORWARD AT MULTIPLE LAYERS OF CONTROL POINTS UNTIL CENTRAL ACCESS POINT REACHED", where PCPs at different layers of the network structure shown in FIG. 4 may forward the aggregated communication traffic from user devices and other PCPs at lower levels to PCPs at higher levels until a central access point such as access point 470 of FIG. 4 is reached.

The blocks included in the above described process are for illustration purposes. Providing a scalable, millimeter-wave wireless network for high user concentrations may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 8:
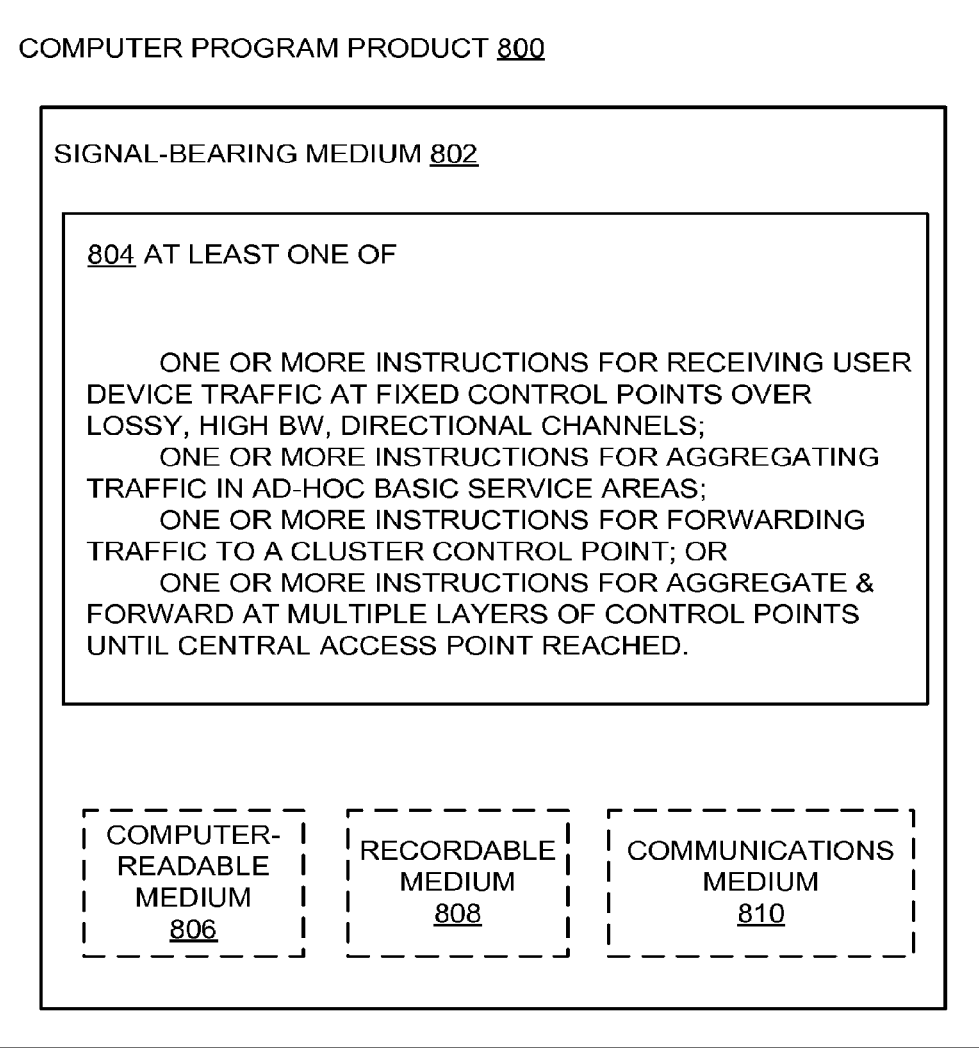
FIG. 8 illustrates a block diagram of an example computer program product, all arranged in accordance with at least some embodiments described herein.

FIG. 8 illustrates a block diagram of an example computer program product, arranged in accordance with at least some embodiments described herein. In some examples, as shown in FIG. 8, the computer program product 800 may include a signal bearing medium 802 that may also include one or more machine readable instructions 804 that, when executed by, for example, a processor, may provide the functionality described herein. Thus, for example, referring to the processor 504 in FIG. 5, the transceiver module 526 may undertake one or more of the tasks shown in FIG. 8 in response to the instructions 804 conveyed to the processor 504 by the medium 802 to perform actions associated with providing a scalable, millimeter-wave wireless network for high user concentrations as described herein. Some of those instructions may include, for example, instructions for receiving user device traffic at fixed control points over lossy, high bandwidth, and directional channels; aggregating traffic in ad-hoc basic service areas; forwarding traffic to a cluster control point; and/or aggregating and forwarding at multiple layers of control points until a central access point is reached, according to some embodiments described herein.

In some implementations, the signal bearing medium 802 depicted in FIG. 8 may encompass a computer-readable medium 806, such as, but not limited to, a hard disk drive, a solid state drive, a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the program product 800 may be conveyed to one or more modules of the processor 804 by an RF signal bearing medium, where the signal bearing medium 802 is conveyed by the wireless communications medium 810 (e.g., a wireless communications medium conforming with the IEEE 802.11 standard).

According to some examples, a method for providing a scalable wireless network architecture for high-user concentrations may include forming a network structure based on a plurality of wireless central points (PCPs) each PCP serving an ad-hoc basic service area (BSA) and aggregating communication traffic within their respective BSA for forwarding to a cluster PCP within a clustered hierarchical network, and enabling wireless communication between user devices and respective PCPs over one or more lossy, high-bandwidth, directional channels.

The BSAs may be configured as highly localized service areas. The service areas may be confined to less than about 10 meters and cover a fixed local area. The communication channels may employ the millimeter-wave band. The method may further include extending the aggregating and forwarding of the communication traffic through a plurality of layers, where each PCP services the user devices in its BSA and serves as a relay point for other PCPs in its cluster.

The network structure may be scalable based on a number of the layers. The top layer of the network structure may include a cluster with a central access point to couple to a backhaul network. The method may also include mediating an access to each PCP by scheduled service intervals so that competing transmissions from different user devices and other PCPs over a same channel occur during non-overlapping time periods. The method may include aggregating frames at each PCP, where the network structure employs a Personal Basic Service Set (PBSS) standard providing station clustering and multi-link relaying at ad-hoc BSA levels. The network structure may also employ a Basic Service Set (BSS) standard providing fixed PCPs and frame aggregation for network infrastructure.

According to other examples, a scalable wireless network for high-user concentrations may include a plurality of wireless central points (PCPs) each PCP serving an ad-hoc basic service area (BSA) and aggregating communication traffic within their respective BSA for forwarding to a cluster PCP within a clustered hierarchical network; and a plurality of user devices in each BSA enabled to wirelessly communicate with respective PCPs over one or more lossy, high-bandwidth, directional channels.

The BSAs may be configured as highly localized service areas. The service areas may be confined to less than about 10 meters and cover a fixed local area. The communication channels may employ the millimeter-wave band. The aggregating and forwarding of the communication traffic may be extended through a plurality of layers and each PCP services the user devices in its BSA and serves as a relay point for other PCPs in its cluster.

The network structure may be scalable based on a number of the layers. A top layer of the network structure may include a cluster with a central access point to couple to a backhaul network. An access to each PCP may be mediated by scheduled service intervals so that competing transmissions from different user devices and other PCPs over a same channel occur during non-overlapping time periods. The frames may be aggregated at each PCP. The network structure may employ a Personal Basic Service Set (PBSS) standard providing station clustering and multi-link relaying at ad-hoc BSA levels or a Basic Service Set (BSS) standard providing fixed PCPs and frame aggregation for network infrastructure.

According to further examples, a computer-readable storage medium may have instructions stored thereon for providing a scalable wireless network architecture for high-user concentrations. The instructions may include forming a network structure based on a plurality of wireless central points (PCPs) each PCP serving an ad-hoc basic service area (BSA) and aggregating communication traffic within their respective BSA for forwarding to a cluster PCP within a clustered hierarchical network; and enabling wireless communication between user devices and respective PCPs over one or more lossy, high-bandwidth, directional channels.

The BSAs may be configured as highly localized service areas. The service areas may be confined to less than about 10 meters and cover a fixed local area. The communication channels may employ the millimeter-wave band. The instructions may further include extending the aggregating and forwarding of the communication traffic through a plurality of layers, where each PCP services the user devices in its BSA and serves as a relay point for other PCPs in its cluster.

The network structure may be scalable based on a number of the layers. The top layer of the network structure may include a cluster with a central access point to couple to a backhaul network. The instructions may also include mediating an access to each PCP by scheduled service intervals so that competing transmissions from different user devices and other PCPs over a same channel occur during non-overlapping time periods. The instructions may include aggregating frames at each PCP, where the network structure employs a Personal Basic Service Set (PBSS) standard providing station clustering and multi-link relaying at ad-hoc BSA levels. The network structure may also employ a Basic Service Set (BSS) standard providing fixed PCPs and frame aggregation for network infrastructure.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim 1ncludes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for providing a scalable wireless network architecture for high-user concentrations, the method comprising:
    forming a network structure based on a plurality of wireless central points (PCPs) each PCP serving an ad-hoc basic service area (BSA) and aggregating communication traffic within their respective BSA for forwarding to a cluster PCP through a stationary BSA control-point device within a clustered hierarchical network, the network leverages high free-space path-loss to minimize interference;
    enabling wireless communication between user devices and respective PCPs over one or more lossy, high-bandwidth, directional channels as communication channels; and
    enabling the wireless communication through efficient sharing of the communication channels by supporting a multi-source subframe addressing and a multi-destination subframe addressing in the wireless communication.

2. The method according to claim 1, wherein the BSAs are configured as highly localized service areas.

3. The method according to claim 2, wherein the service areas are confined to less than about 10 meters.

4. The method according to claim 2, wherein the service areas cover a fixed local area.

5. The method according to claim 1, wherein the communication channels employ the millimeter-wave band.

6. The method according to claim 1, further comprising extending the aggregating and forwarding of the communication traffic through a plurality of layers, wherein each PCP services the user devices in its BSA and serves as a relay point for other PCPs in its cluster.

7. The method according to claim 6, wherein the network structure is scalable based on a number of the layers.

8. The method according to claim 6, wherein a top layer of the network structure includes a cluster with a central access point to couple to a backhaul network.

9. The method according to claim 1, further comprising mediating an access to each PCP by scheduled service intervals so that competing transmissions from different user devices and other PCPs over a same channel occur during non-overlapping time periods.

10. The method according to claim 1, further comprising aggregating frames at each PCP.

11. The method according to claim 1, wherein the network structure employs a Personal Basic Service Set (PBSS) standard providing station clustering and multi-link relaying at ad-hoc BSA levels.

12. The method according to claim 1, wherein the network structure employs a Basic Service Set (BSS) standard providing fixed PCPs and frame aggregation for network infrastructure.

13. A scalable wireless network for high-user concentrations, the network comprising:
    a plurality of wireless central points (PCPs) each PCP serving an ad-hoc basic service area (BSA) and aggregating communication traffic within their respective BSA for forwarding to a cluster PCP through a stationary BSA control-point device within a clustered hierarchical network, which support multi-link relaying to optimize spatial frequency sharing among channels, and wherein the network leverages high free-space path-loss to minimize interference;
    a plurality of a Personal Basic Service Set (PBSS) standard and a Basic Service Set (BSS) standard combined to form a hybrid architecture used to relay the communication traffic in the network; and
    a plurality of user devices in each BSA enabled to wirelessly communicate with respective PCPs over one or more lossy, high-bandwidth, directional channels.

14. The network according to claim 13, wherein the BSAs are configured as highly localized service areas.

15. The network according to claim 14, wherein the service areas are confined to less than about 10 meters.

16. The network according to claim 14, wherein the service areas cover a fixed local area.

17. The network according to claim 13, wherein the communication channels employ the millimeter-wave band.

18. The network according to claim 13, the aggregating and forwarding of the communication traffic is extended through a plurality of layers and each PCP services the user devices in its BSA and serves as a relay point for other PCPs in its cluster.

19. The network according to claim 18, wherein the network structure is scalable based on a number of the layers.

20. The network according to claim 18, wherein a top layer of the network structure includes a cluster with a central access point to couple to a backhaul network.

21. The network according to claim 13, wherein an access to each PCP is mediated by scheduled service intervals so that competing transmissions from different user devices and other PCPs over a same channel occur during non-overlapping time periods.

22. The network according to claim 13, wherein frames are aggregated at each PCP.

23. The network according to claim 13, wherein the network structure employs the Personal Basic Service Set (PBSS) standard providing station clustering and multi-link relaying at ad-hoc BSA levels.

24. The network according to claim 13, wherein the network structure employs the Basic Service Set (BSS) standard providing fixed PCPs and frame aggregation for network infrastructure.

25. A computer-readable storage medium having instructions stored thereon for providing a scalable wireless network architecture for high-user concentrations, the instructions comprising:
    forming a network structure based on a plurality of wireless central points (PCPs) each PCP serving an ad-hoc basic service area (BSA) and aggregating communication traffic within their respective BSA for forwarding to a cluster PCP through a stationary BSA control-point device within a clustered hierarchical network, which support multi-link relaying to optimize spatial frequency sharing among channels, and wherein the network leverages high free-space path-loss to minimize interference;
    combining a Personal Basic Service Set (PBSS) standard and a Basic Service Set (BSS) standard to form a hybrid architecture used to relay the communication traffic in the network;
    enabling wireless communication between user devices and respective PCPs over one or more lossy, high-bandwidth, directional channels as communication channels; and
    enabling the wireless communication through efficient sharing of the communication channels by supporting a multi-source subframe addressing and a multi-destination subframe addressing in the wireless communication.

26. The computer-readable storage medium according to claim 25, wherein the BSAs are configured as highly localized service areas.

27. The computer-readable storage medium according to claim 26, wherein the service areas are confined to less than about 10 meters.

28. The computer-readable storage medium according to claim 26, wherein the service areas cover a fixed local area.

29. The computer-readable storage medium according to claim 25, wherein the communication channels employ the millimeter-wave band.

30. The computer-readable storage medium according to claim 25, wherein the instructions further comprise extending the aggregating and forwarding of the communication traffic through a plurality of layers, wherein each PCP services the user devices in its BSA and serves as a relay point for other PCPs in its cluster.

31. The computer-readable storage medium according to claim 30, wherein the network structure is scalable based on a number of the layers.

32. The computer-readable storage medium according to claim 30, wherein a top layer of the network structure includes a cluster with a central access point to couple to a backhaul network.

33. The computer-readable storage medium according to claim 25, wherein the instructions further comprise mediating an access to each PCP by scheduled service intervals so that competing transmissions from different user devices and other PCPs over a same channel occur during non-overlapping time periods.

34. The computer-readable storage medium according to claim 25, wherein the instructions further comprise aggregating frames at each PCP.

35. The computer-readable storage medium according to claim 25, wherein the network structure employs the Personal Basic Service Set (PBSS) standard providing station clustering and multi-link relaying at ad-hoc BSA levels.

36. The computer-readable storage medium according to claim 25, wherein the network structure employs the Basic Service Set (BSS) standard providing fixed PCPs and frame aggregation for network infrastructure.

* * * * *

UNITED STATES PATENT AND TRADEMARK OFFICE
CERTIFICATE OF CORRECTION

PATENT NO. : 8,855,553 B2  
APPLICATION NO. : 13/574246  
DATED : October 7, 2014  
INVENTOR(S) : Duerksen Page 1 of 1

It is certified that error appears in the above-identified patent and that said Letters Patent is hereby corrected as shown below:

On the Title Page, in item (56), under "OTHER PUBLICATIONS", in Column 2, Line 8, delete "WiFiTechnology," and insert -- WiFi Technology, --, therefor.

In the Drawings

In Fig. 5, Sheet 5 of 8, delete "UP/UC/DSP" and insert -- $\mu P/\mu C/DSP$ --, therefor.

In Fig. 5, Sheet 5 of 8, delete Tag "528" and insert Tag -- 524 --, therefor.

In the Specification

In Column 1, below Title, Line 4, insert -- CROSS-REFERENCE TO RELATED APPLICATION
The present application is a U.S. national stage application claiming the benefit of International Application No. PCT/US2012/027357, under 35 U.S.C. §371, filed on Mar. 2, 2012, the entire contents of which are incorporated herein by reference. --.

In Column 3, Line 40, delete "concentrations" and insert -- concentrations. --, therefor.

In Column 5, Line 33, delete "needs be" and insert -- needs to be --, therefor.

In Column 14, Line 14, delete "1ncludes" and insert -- includes --, therefor.

In the Claims

In Column 15, Line 12, in Claim 1, delete "network, the" and insert -- network, wherein the --, therefor.

Signed and Sealed this
Fourteenth Day of April, 2015

Michelle K. Lee
*Director of the United States Patent and Trademark Office*